(12) United States Patent
Stähiln et al.

(10) Patent No.: US 10,341,231 B2
(45) Date of Patent: Jul. 2, 2019

(54) METHOD FOR HANDLING A RECEIVED VEHICLE-TO-X MESSAGE IN A VEHICLE, VEHICLE-TO-X COMMUNICATIONS MODULE AND STORAGE MEDIUM

(71) Applicant: Continental Teves AG & Co. oHG, Frankfurt (DE)

(72) Inventors: Ulrich Stähiln, Eschborn (DE); Richard Scherping, Liederbach am Taunus (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 0 days.

(21) Appl. No.: 15/492,570

(22) Filed: Apr. 20, 2017

(65) Prior Publication Data

US 2017/0230286 A1    Aug. 10, 2017

Related U.S. Application Data

(63) Continuation of application No. PCT/EP2015/074002, filed on Oct. 16, 2015.

(30) Foreign Application Priority Data

Oct. 24, 2014 (DE) .................... 10 2014 221 726

(51) Int. Cl.
*H04L 12/741* (2013.01)
*H04W 4/04* (2009.01)
*H04L 29/06* (2006.01)
*H04L 29/08* (2006.01)

(52) U.S. Cl.
CPC .............. *H04L 45/74* (2013.01); *H04L 69/22* (2013.01); *H04L 69/321* (2013.01); *H04W 4/046* (2013.01)

(58) Field of Classification Search
CPC .... H04L 67/12; H04L 69/22; G01C 21/26–32
See application file for complete search history.

(56) References Cited

U.S. PATENT DOCUMENTS

| 7,263,438 B2 | 8/2007 | Furukawa |
| 2007/0271029 A1 | 11/2007 | Tzamaloukas |
| 2010/0030423 A1 | 2/2010 | Nathanson |

(Continued)

FOREIGN PATENT DOCUMENTS

| DE | 19837618 A1 | 3/1999 |
| DE | 102008012654 A1 | 3/2009 |

(Continued)

OTHER PUBLICATIONS

German Office Action dated Jun. 24, 2015 for corresponding German application 10 2014 221 726.1.

(Continued)

*Primary Examiner* — Pao Sinkantarakorn

(57) ABSTRACT

The invention relates to a method for handling a received vehicle-to-X message in a vehicle, said message having at least a header and a body, and only the header without the body being forwarded to a self-learning map, in particular if it is established that the message is suitable for simplified processing. The invention also relates to a vehicle-to-X communications module and a storage medium for carrying out the method.

24 Claims, 2 Drawing Sheets

(56) References Cited

U.S. PATENT DOCUMENTS

| | | | | |
|---|---|---|---|---|
| 2010/0329257 | A1* | 12/2010 | Vanzante | ............... H04L 49/90 370/392 |
| 2011/0047338 | A1* | 2/2011 | Stahlin | .................. G01C 21/28 711/154 |
| 2011/0227757 | A1 | 9/2011 | Chen et al. | |
| 2012/0268295 | A1 | 10/2012 | Yuse et al. | |

FOREIGN PATENT DOCUMENTS

| | | |
|---|---|---|
| DE | 102008061304 A1 | 7/2009 |
| DE | 102009017731 A1 | 11/2009 |
| DE | 102011003624 A1 | 8/2012 |
| DE | 102011078704 A1 | 1/2013 |
| EP | 1347427 A2 | 9/2003 |
| WO | WO2013004750 A1 | 1/2013 |

OTHER PUBLICATIONS

International Search Report and Written Opinion dated Oct. 16, 2015 from corresponding International Patent Application No. PCT/EP2015/074002.

* cited by examiner

METHOD FOR HANDLING A RECEIVED VEHICLE-TO-X MESSAGE IN A VEHICLE, VEHICLE-TO-X COMMUNICATIONS MODULE AND STORAGE MEDIUM

CROSS-REFERENCE TO RELATED APPLICATION

This application claims the benefit of PCT Application PCT/EP2015/074002, filed Oct. 16, 2015, which claims priority to German Application DE 10 2014 221 726.1, filed Oct. 24, 2014. The disclosures of the above applications are incorporated herein by reference.

TECHNICAL FIELD

The invention relates to a method and a module for handling a received vehicle-to-X message in a vehicle.

BACKGROUND

Vehicle-to-X communications, also referred to as car-to-X communications or, in short, as C2X communications, are currently on the way to being introduced into mass production. Vehicle-to-X communications is currently in a phase of development and standardization. This term is understood to mean in particular communication between vehicles (vehicle-to-vehicle communication) and communication between vehicles and infrastructure (vehicle-to-infrastructure communication).

The term "vehicle-to-X communications" thereby denotes in particular the combination of vehicle-to-vehicle communications and vehicle-to-infrastructure communications.

In particular, vehicles at particular distances, or also in the case of certain events, emit vehicle-to-X messages which include, for example, information about speed, position, course, acceleration or particular events such as, for example, breakdowns or emergency braking maneuvers.

In order to be able to evaluate received vehicle-to-X messages in a vehicle, for example in order to be able to identify possible hazards for the vehicle, it is helpful to have an accurate map of the surrounding roads available in the vehicle. For example, electronic road maps, which are based on data from government agencies or on other sources and which are permanently stored in the vehicle, can be used for this purpose. However, such a map is typically only available with limited accuracy/In addition, they are only sporadically updated so that changing courses of roads or newly added roads, which are based, for example, on construction projects since the last update, are not taken into account. This can result in vehicle-to-X messages being incorrectly interpreted. In addition, many vehicles do not have a permanently stored electronic road map for cost reasons.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A self-learning map, which is also referred to as a road graph, can in particular be created and updated based on position data from its own vehicle and also on received position data from other vehicles. Such position data is typically established by position determining methods such as satellite navigation or triangulation in cellular networks. In this case it can typically be assumed that at a position where there is a vehicle there is also a road. By combining suitable position data, for example in the form of a "column of ants", roads which were previously unknown to the self-learning map can be identified. Likewise, altered courses of roads can be identified. This makes it possible to update the self-learning map in real time, signifying a clear advantage for the evaluation of vehicle-to-X communications data.

However, substantially more received vehicle-to-X messages should be evaluated in order to create a self-learning map, than for other applications of the vehicle-X communications. This can mean a considerable computational cost which can only be handled with difficulty even by systems which have considerable computing capacities. The reason for this is that the body of a respective vehicle-to-X message is typically encoded, in particular it is encoded by means of ASN.1 coding, so that it must be decoded by means of a complex method before it can be evaluated. The creation of a self-learning map could therefore fail because of the computing capacity required. This is particularly true of reasonably-priced vehicles where the costs associated with using a high level of computing capacity would be unacceptable.

Therefore, a method for handling a received vehicle-to-X message in a vehicle makes it possible to create a self-learning map even with a low computing capacity. A vehicle-to-X communications module is provided which is configured to carry out such a method.

Therefore, a received vehicle-to-X message in a vehicle comprises at least a header and a body. The method comprises establishing whether the message is suitable for simplified processing, and forwarding of the header without the body to a self-learning map if the message is suitable for simplified processing, and forwarding of the header with the body to the self-learning map if the message is not suitable for simplified processing.

Received vehicle-to-X messages are first classified before they are forwarded or further processed. With a plurality of received vehicle-to-X messages, it is sufficient to process the header, so that the body does not absolutely have to be further processed. In this way, the computing capacity required for the processing, for example for the decoding of the body, can be saved, without having to dispense with using all of the received messages in order to create a self-learning map.

A vehicle-to-X message which can be processed is typically a message which has been emitted by a different vehicle. This message typically contains at least position data from this other vehicle. In typical implementations of vehicle-to-X communications systems such messages are directly exchanged between the vehicles, which means, in particular, that they do not have to be conveyed by a cellular network or another external infrastructure.

In addition to the header and the body, the message can also comprise additional parts.

The header typically contains information such as the position, speed and course of the transmitting vehicle and can, for example, additionally contain information such as an identification of the vehicle or a type of message. For example, it is possible to display by means of a message type 2/0/0 that the message is a Cooperative Awareness Message (CAM) in the form of a status message, or it is possible to display by means of a message type 3/99/1 that the message is a Decentralized Environment Notification Message (DENM) in the form of a warning about a vehicle which is braking sharply. It is understood that the header can also include a random selection of the indicated information or additional information. The header can also be referred to as a header. It is typically not encoded and is therefore in plain text.

The body is typically encoded by means of ASN.1. It typically contains more extensive information, for example information for certain applications. This can be, for example, information such as the acceleration, deceleration, steering wheel angle or type of vehicle. However, this information is typically only accessible by means of a relatively sophisticated decoding operation.

A message suitable for simplified processing can, in particular, denote a message for which there is no reason for decoding or other processing of the body outside the self-learning map. The classification can be effected, for example, as described further below.

The self-learning map can, for example, be run in an electronic unit which also carries out the method according to the invention. However, it can also be run, for example, in another electronic unit which is coupled, for example, to the electronic unit carrying out the method. To this end, a vehicle-bus system, for example a CAN-bus system, can be used in particular.

According to one embodiment, a check is carried out during the establishing stage as to whether the message is relevant to applications in the vehicle. Such applications can, for example, be applications which are able to warn a driver about possible breakdowns or other dangers.

According to one embodiment, the message is not suitable for simplified processing, if the message is relevant to at least one application in the vehicle. In other words, this can mean that further processing will take place by means of at least one application in the vehicle so that it is not typically necessary to process the message completely and the possibility of simplified processing is not considered. If the message is not relevant to any application in the vehicle, simplified processing of the message is, however, possible. In this case, processing in particular of the body of the message can typically be dispensed with. It is therefore not necessary, in this case, to decode said body.

If the body has been decoded, it is preferably forwarded to the self-learning map in a decoded form. The self-learning map can therefore possibly obtain additional information from the message, which it can use to improve the information it holds about the roads or other important elements. If a message has not been decoded, for example because it is not relevant to an application, the header can, however, typically still be evaluated. It is true that said header contains less information, but this only slightly affects the use of the message in the self-learning map.

Alternatively, a method for handling a received vehicle-to-X message in a vehicle comprises forwarding of the header without the body to a self-learning map irrespective of whether the message is suitable for simplified processing.

The signal processing can be even further simplified wherein the functionality of the self-learning map is still largely preserved. According to one embodiment, it is possible to dispense with the establishment of whether the message is suitable for simplified processing. It can, however, also be carried out and used for other purposes, for example in order to establish whether the message should be forwarded to an application layer, i.e. for example whether it is relevant to at least one application in the vehicle.

If the message is relevant to at least one application in the vehicle, it is preferably forwarded to an application layer. This application layer can be a software module or a separate hardware module, wherein the corresponding applications are carried out in the application layer, which applications can then warn the driver, for example, in the event of a collision hazard being identified.

The method preferably comprises involving the decoding of the body of the message prior to forwarding said message to an application layer. In particular, a decoding according to ASN.1 can be used for this. The information contained in the body of the message, which typically goes beyond the information contained in the header, is therefore accessible. It can typically be used by appropriate applications in the vehicle.

If the message is suitable for simplified processing, the body is preferably not decoded, which means a saving of computing capacity. As the inventors have realized, a considerable portion of the vehicle-to-X messages received in practice are suitable for simplified processing, if recourse is had to useful recognition algorithms. This makes it possible to use a self-learning map without the necessity of installing particularly powerful computing units.

According to one embodiment, the message is additionally forwarded to a stack, if further processing by the stack is required, in particular on the basis of a standard. Such further processing can, for example, be emitting the received message. This can, for example, be described as hopping and takes place, for example, in the case of Decentralized Environment Notification Messages (DENMs) which typically inform drivers of hazardous situations and should therefore be distributed as widely as possible. The vehicle can in this case operate as a relay, for example, which further distributes the message to other road users. Such a stack can, for example, be a function which takes on such forwarding.

It is understood that the self-learning map is not deemed to be an application in this case, but should rather be understood to be one of the applications described here which differ from the self-learning map.

This may carried out in such a way that the header of the message is, in each case, forwarded to the self-learning map. This procedure is based on the knowledge that the header of the message can be used, in virtually every case, to improve the existing data about roads in the self-learning map. The header is typically also accessible without any particular computational cost. On the other hand, the question of whether the body is transmitted as well typically depends on whether the message is suitable for simplified processing.

An application layer can be downstream of the self-learning map so that the message is forwarded to the application layer by means of the self-learning map. In such an implementation it is possible to check, for example, in the self-learning map itself whether the message is relevant to the vehicle in view of the information about roads stored in said self-learning map, i.e. for example whether the message contains a warning about a collision danger which actually exists. Suitable information can then also be transferred immediately as well by the self-learning map to the application layer.

Alternatively, the application layer can also be arranged parallel to the self-learning map so that the message is forwarded to the self-learning map in parallel to and/or independently of the forwarding to the application layer. In particular, this can mean that the self-learning map receives the message at the same time or at virtually the same time as the application layer, and that the application or the application layer obtains, where appropriate, information from the self-learning map separately, if said information is required to assess the relevance of the received message.

During the transmission of messages to the self-learning map, information which is generated within the framework of preprocessing such as, for example, distances in coordinates of the own vehicle (ego-vehicle coordinates) or results of plausibility checks can be forwarded to the self-learning map, without having to modify a normal interface with a normal stack.

A vehicle-to-X communications module is configured to carry out these instructions. The vehicle-to-X communications module can, in particular, be designed as a microcontroller, microprocessor, freely programmable computer or other freely programmable unit, a programmable logic controller (PLC) or an application-specific integrated circuit (ASIC). In particular, the vehicle-to-X communications module can contain processor means and storage means, wherein the program code is stored in the storage means, during the running of which by the processor these instructions are carried out.

The invention also relates to a non-volatile computer-readable storage medium which contains a program code, during the running of which by a processor a method according to the invention is carried out.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A preprocessing 10 is initially carried out in accordance with both the first and the second embodiment examples, during which preprocessing it is identified whether the received message is suitable for simplified processing. In each case, the message contains a header and a body, said header being available in plain text, whereas the body is ASN.1 encoded and is therefore only accessible following elaborate decoding. Within the framework of the preprocessing 10 it is, in particular, established whether the message is relevant to at least one application in the vehicle. If this is the case, the message is not suitable for simplified processing. However, if the message is not relevant to any application in the vehicle, it is suitable for simplified processing.

Figure 1:
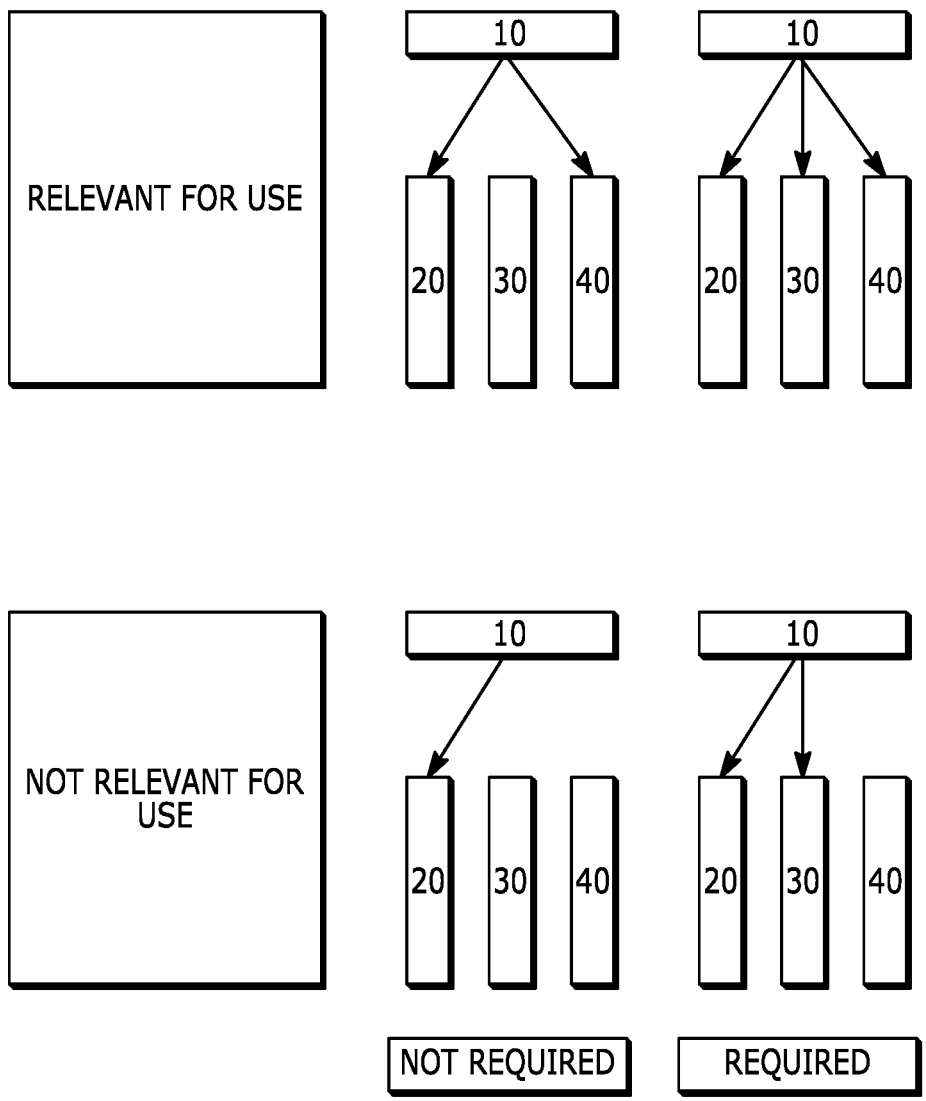
FIG. 1: shows a matrix with four possible ways of processing a message according to a first embodiment.
Figure 2:
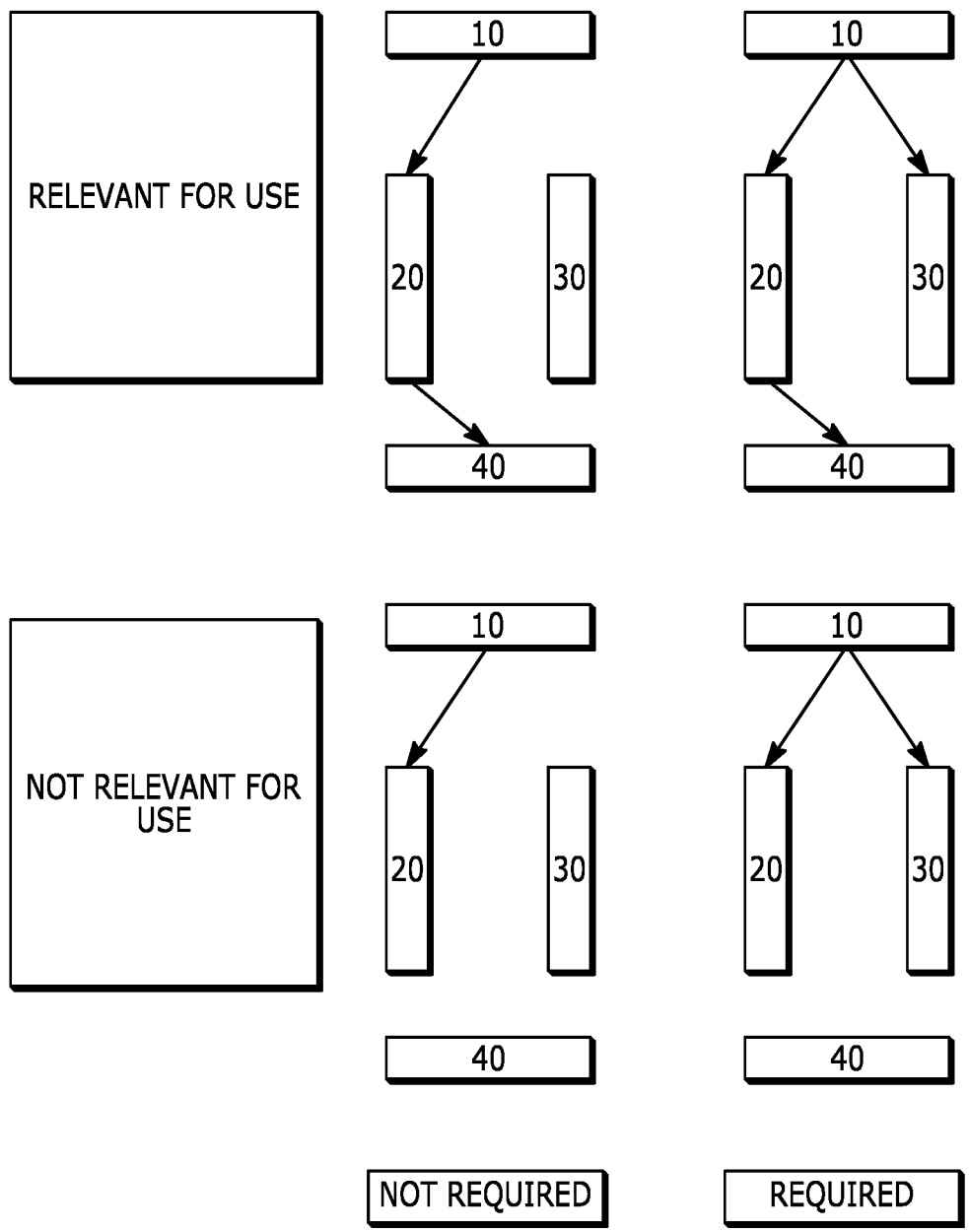
FIG. 2: shows a matrix with four possible ways of processing a message according to a second embodiment.

Four conditions are shown in each of the matrices illustrated in FIG. 1 and FIG. 2. One box is allocated to each condition. The two upper boxes show the scenario where the message is relevant to at least one application, i.e. it is not suitable for simplified processing. The two lower boxes show the scenario where the message is not relevant to any application, and is therefore suitable for simplified processing. By way of contrast, the two respective lines differ in terms of whether or not the message is required for further processing by a stack. The former case is shown in both the right boxes respectively, whereas the latter case is shown in both the left boxes respectively.

As shown, the message is in any case forwarded to a self-learning map 20. If the application is not suitable for simplified processing, it is already decoded within the framework of the preprocessing 10 and is forwarded in full to the self-learning map 20. If, however, the message is suitable for simplified processing, only its header, but not the body, is transmitted to the self-learning map 20. The difference between these two types of transmission is shown in FIGS. 1 and 2 in that the transmission in full is shown with a solid arrow, whereas the transmission of only the header is shown with a dotted arrow.

It is also possible to essentially transmit exclusively the header of the message to the self-learning map 20. This results in a simplified self-learning map 20 and is not explicitly shown in the drawing, but is considered to be one embodiment example of the invention.

The self-learning map 20 uses the message to update courses of roads and also to identify newly added roads. This makes it possible to create and update mapping material in an advantageous manner, without having to rely on external installations.

If the message is required for further processing, it is additionally forwarded to a stack 30. This ensures that the message is further processed in an appropriate manner, in particular in accordance with a standard, which can mean, for example, that a message is emitted again. This can be effected, for example, in the case of Decentralized Environment Notification Messages (DENMs) which, as hazard messages, are to be distributed as widely as possible. However, Cooperative Awareness Messages (CAMs) can typically be processed in such a way that they are only evaluated in the vehicle and are not forwarded. In that case, it is possible to dispense with forwarding of the message to the stack 30. The message is always forwarded to the stack 30 as specified by the standardization, for example in full and also in a decoded form.

If the message is relevant to at least one application, it is additionally forwarded to an application layer 40. This is essentially effected in a complete form, with the body having already been decoded. The two embodiment examples then differ, as can be seen in the two figures. In the case of the first embodiment example shown in FIG. 1, the message is forwarded simultaneously or in parallel to the self-learning map 20 and to the application layer 40. The message has therefore not yet been processed by the self-learning map 20 when it is received by the application layer 40. The application layer 40 then typically checks whether the message includes certain relevant information for the vehicle, to which end it can, for example, separately access the self-learning map 20. This is not shown in the figures. For example, the application layer 40 can access the self-learning map 20, in order to check whether the message has been emitted by a vehicle which is located on the same road as the vehicle which is carrying out the method according to the invention.

In the case of the second embodiment example shown in FIG. 2, the message is essentially initially forwarded to the self-learning map 20 and is forwarded from there to the application layer 40. The self-learning map 20 can, in this case, automatically check whether certain information is required for the further processing of the message in the application layer 40. For example, information about the course of a road can be necessary for this purpose. Such information can then be forwarded by the self-learning map 20 with the message to the application layer 40, so that said application layer receives the message in a form in which it has already been augmented by information supplied by the self-learning map 20.

It is understood that, in practice, most of the received messages in vehicle-to-X communications are not relevant to any application in the vehicle and are therefore suitable for simplified processing. In the majority of cases, the decoding of the body of the respective message can therefore be dispensed with, considerably saving computing capacity. It is therefore possible to operate a self-learning map 20 with less computing capacity as well.

If essentially only the header of the messages is forwarded to the self-learning map, it is advantageous to use the embodiment illustrated in FIG. 1, in which the message is forwarded to the application layer 40 and the self-learning map 20 independently of each other. This avoids the scenario of information which may be necessary not arriving at the application layer 40.

In general, it is pointed out that the term "vehicle-to-X communications" particularly denotes direct communications between vehicles and/or between vehicles and infrastructure installations. For example, these can be vehicle-to-vehicle communications or vehicle-to-infrastructure communications. If reference is made within the context of this application to communications between vehicles, these can essentially take place, for example, within the framework of vehicle-to-vehicle communications which typically take place without being conveyed by means of a cellular network or a similar external infrastructure and which are therefore to be distanced from other solutions which are based, for example, on a cellular network. For example, vehicle-to-X communications can take place using the standards IEEE 802.11p or IEEE1609.4. Vehicle-to-X communications can also be referred to as C2X communications. The sub-areas can be described as C2C (car-to-car) or C2I (car-to-infrastructure). However, the invention does not explicitly exclude vehicle-to-X communications which involve messages being conveyed, for example, by means of a cellular network.

It is pointed out that configurations, features and variants of the invention, which are described in the different embodiments or embodiment examples and/or shown in the figures, can be freely combined with one another. Individual or multiple features are freely interchangeable. The resulting combinations of features are also to be understood to also be covered by the disclosure of this application.

Features, which are merely disclosed in the description, or features, which are only disclosed in combination with other features in the description or in a claim, can, in principle, be of importance independently and can be essential to the invention. They can therefore also be individually incorporated into claims in order to distance the invention from the prior art. The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for handling a received vehicle-to-X message in a vehicle comprising:
   establishing whether the message having at least a header and a body is suitable for simplified processing;
   forwarding of the header without the body to a self-learning map, when the message is suitable for simplified processing; and
   forwarding of the header with the body to the self-learning map, when the message is not suitable for simplified processing.

2. The method according to claim 1, further comprising checking whether the message is relevant to applications in the vehicle.

3. The method according to claim 2, further comprising determining the message is not suitable for simplified processing when the message is relevant to at least one application in the vehicle and determining the message is suitable for simplified processing if the message is not relevant to an application in the vehicle.

4. The method according to claim 2, further comprising forwarding the message to an application layer when it is relevant to at least one application in the vehicle.

5. The method according to claim 1, further comprising:
   decoding the header; and
   forwarding the header in the decoded form to the self-learning map.

6. The method according to claim 1, further comprising forwarding the header without the body to a self-learning map irrespective of whether the message is suitable for simplified processing.

7. The method according to claim 1, further comprising:
   decoding the header; and
   forwarding the header in the decoded form to an application layer.

8. The method according to claim 1, wherein the header is not decoded if the message is suitable for simplified processing.

9. The method according to claim 1, further comprising forwarding the message to a stack when further processing by the stack is required on the basis of a standard.

10. The method according to claim 1, wherein further processing by the stack is carried out in such a way that the header of the message is forwarded in any case to the self-learning map.

11. The method according to claim 1, wherein an application layer is downstream of the self-learning map such that the message is forwarded by the self-learning map to the application layer.

12. The method according to claim 1, wherein an application layer is parallel to the self-learning map such that the message is forwarded to the self-learning map by at least one of: in parallel to and independently of the forwarding to the application layer.

13. A non-volatile computer-readable storage medium which contains a program code, with instructions for: establishing whether the message having at least a header and a body is suitable for simplified processing;
   forwarding of the header without the body to a self-learning map, when the message is suitable for simplified processing; and
   forwarding of the header with the body to the self-learning map, when the message is not suitable for simplified processing.

14. The storage medium according to claim 13, further comprising checking whether the message is relevant to applications in the vehicle.

15. The storage medium according to claim 14, further comprising determining the message is not suitable for simplified processing when the message is relevant to at least one application in the vehicle and determining the message is suitable for simplified processing if the message is not relevant to an application in the vehicle.

16. The storage medium according to claim 14, further comprising forwarding the message to an application layer when it is relevant to at least one application in the vehicle.

17. The storage medium according to claim 14, wherein the storage medium is a communication module for a vehicle.

18. The storage medium according to claim 13, further comprising:
 decoding the header; and
 forwarding the header in the decoded form to the self-learning map.

19. The storage medium according to claim 13, further comprising forwarding the header without the body to a self-learning map irrespective of whether the message is suitable for simplified processing.

20. The storage medium according to claim 13, further comprising:
 decoding the header; and
 forwarding the header in the decoded form to an application layer.

21. The storage medium according to claim 13, further comprising forwarding the message to a stack when further processing by the stack is required on the basis of a standard.

22. The storage medium according to claim 13, wherein further processing by the stack is carried out in such a way that the header of the message is forwarded in any case to the self-learning map.

23. The storage medium according to claim 13, wherein an application layer is downstream of the self-learning map such that the message is forwarded by the self-learning map to the application layer.

24. The storage medium according to claim 13, wherein an application layer is parallel to the self-learning map such that the message is forwarded to the self-learning map by at least one of: in parallel to and independently of the forwarding to the application layer.

\* \* \* \* \*